United States Patent [19]

Nelissen et al.

[11] Patent Number: 5,310,820
[45] Date of Patent: May 10, 1994

[54] PROCESS FOR MODIFICATION OF POLYPHENYLENE ETHER OR RELATED POLYMERS WITH A CYCLIC ACID ANHYDRIDE AND THE USE THEREOF IN MODIFIED, HIGH TEMPERATURE RIGID PLYMER OF VINYL SUBSTITUTED AROMATICS

[75] Inventors: Laurentius N. I. H. Nelissen, Eindhoven; Johannes M. Zijderveld, BG Breda, both of Netherlands

[73] Assignee: Shell Research Limited, United Kingdom

[21] Appl. No.: 945,438

[22] Filed: Sep. 14, 1992

Related U.S. Application Data

[63] Continuation of Ser. No. 525,552, May 21, 1990, abandoned.

[30] Foreign Application Priority Data

Jun. 13, 1989 [GB] United Kingdom ............. 8913542

[51] Int. Cl.$^5$ ............................................. C08G 65/48
[52] U.S. Cl. .................................... 525/391; 525/392; 525/397; 526/89; 526/201; 526/203
[58] Field of Search ................... 525/391, 392, 397; 526/201, 203, 89

[56] References Cited

U.S. PATENT DOCUMENTS

| | | | |
|---|---|---|---|
| 3,862,263 | 1/1975 | Maruta et al. | 260/874 |
| 4,048,143 | 9/1977 | Hay et al. | 260/47 |
| 4,156,773 | 5/1979 | Loucks et al. | 528/214 |
| 4,189,417 | 2/1980 | Goossens | 260/29.6 |
| 4,287,321 | 9/1981 | Olander | 525/392 |
| 4,743,661 | 5/1988 | Mitulla et al. | 525/396 |

FOREIGN PATENT DOCUMENTS

| | | |
|---|---|---|
| 0261574 | 3/1988 | European Pat. Off. |
| 0264623 | 4/1988 | European Pat. Off. |
| 8302117 | 6/1983 | PCT Int'l Appl. |

*Primary Examiner*—Harold D. Anderson

[57] ABSTRACT

Process for the manufacture of modified polyphenylene ether or structurally related polymers, comprising the reaction of polyphenylene ether or structurally related polymer with a cyclic acid anhydride, in the presence of a non nucleophilic base, and in an inert polar organic solvent and preferably in a vinyl substituted aromatic monomer as solvent; modified polyphenylene ethers so obtained and use of them for the manufacture of modified high temperature rigid poly(vinyl substituted aromatic) polymer compositions.

3 Claims, No Drawings

PROCESS FOR MODIFICATION OF POLYPHENYLENE ETHER OR RELATED POLYMERS WITH A CYCLIC ACID ANHYDRIDE AND THE USE THEREOF IN MODIFIED, HIGH TEMPERATURE RIGID PLYMER OF VINYL SUBSTITUTED AROMATICS

This application is a continuation of application Ser. No. 07/525,552, filed May 21, 1990, now abandoned.

The invention relates to a process for the modification of polyphenylene ether or structurally related polymers with a cyclic acid anhydride and to the use thereof in modified high temperature rigid polymers of vinyl substituted aromatics. More particularly the invention relates to an improved process for the preparation of modified polyphenylene ether or structurally related polymers by capping the residual free hydroxy groups in such compounds by reaction with a cyclic acid anhydride.

Blends of polymers of vinyl substituted aromatics and poly(2,6-dimethyl-1,4-phenylene ether), furtheron to be indicated by PPE, or structurally related polymers and more particularly blends of polystyrene and PPE have been aimed at for a long time.

However, the polymerization of vinyl substituted aromatics in the presence of PPE was found to be prohibited or inhibited, which causes lower polymerization yields of the vinyl substituted aromatic monomer and more particularly when the PPE is used in a large amount there are some cases where the polymerization does not progress at all. Accordingly, no substantial polymerization could be progressed unless the PPE was used in an amount as small as possible to make the concentration of the vinyl substituted aromatic compound higher.

This phenomenon was especially observed in the case where a vinyl substituted aromatic, and more particularly styrene, was polymerized in an aqueous dispersion in the presence of PPE and optionally a rubber component. Several processes were proposed in the past such as those described in Japanese patent application No. 22069/67; Dutch patent application No. 6,617,529; French patent No. 1,551,503, using large excesses of styrene as to the PPE.

A common feature of all these processes was that in order to decrease the styrene content of the polymerization product, it was necessary to lower polymerization yield. In the case of polymerization of e.g. styrene in a suspension system there was observed a phenomenon, that even if the styrene content of the polymerization is intended to be decreased by lowering the polymerization yield, a large amount of unreacted styrene remains in the polymerization product.

The unreacted monomer relatively high in boiling point, which was contained in such beads, was found to be difficultly removed by drying, with the result that a moulded article obtained from the polymerization product was greatly injured in appearance and was also deteriorated in physical properties.

In order to avoid these disadvantages, several remedies were proposed in the past such as described in e.g. U.S. Pat. No. 3,862,263, proposing a process, in which a relatively small amount of a styrene compound is substantially completely graft polymerized on PPE, optionally mixed with an elastomeric polymer, and as described in U.S. Pat. No. 4,287,321 disclosing the preparation of PPE-poly(vinyl aromatic) compositions by oxidatively coupling a phenol dissolved in a basic reaction medium, comprising a vinyl aromatic compound in the presence of a manganese chelate catalyst, selectively extracting base-reactive by-products, and then thermally polymerizing the vinyl aromatic compound.

As another remedy to avoid the hereinbefore described difficulties, processes were proposed for capping the starting PPE by conversion of the remaining free hydroxyl groups in said PPE with a material capable of reacting therewith to form inert substituents in a mutual solvent such as aromatic solvents like toluene, benzene.

Typical examples of such capping agents include acid halides, acid anhydrides or ketenes as disclosed in e.g. European patent applications Nos. 0,261,574 and 0,264,623 and U.S. Pat. Nos. 4,048,143; 4,189,417; 4,156,773; and 4,165,422.

Although this capping process was known in principle for some time, a rather extensive research for improved and more economical embodiments has still continued, an important part of the efforts being directed to the application of improved alternative capping agents, as appears e.g. from German patent application No. 3,238,930, U.S. Pat. No. 4,743,661 and the International patent application WO 83/02117.

Moreover from Japanese patent No. 49/20379 thermoplastic resin compositions are known, composed of a vinyl compound copolymer e.g. poly(vinyl substituted aromatic), containing segments carrying a polyphenylene-ether side chain and a polymer of a vinyl compound that optionally may be identical to the vinyl compound of the first copolymer. More particularly one of the repeating vinyl components is a maleic acid ester residue, which has been incorporated in the copolymer chain in a relatively high molecular ratio as to the polyphenylene ether residues.

It will be appreciated that this Japanese patent is only teaching copolymers containing maleic acid derivative and more particularly esters thereof as repeating units and does not contain any teaching relating to capping of terminal free hydroxy groups in polyphenylene ethers, having a high molecular weight as compared to the disclosed polyphenylene ether units in this copolymer.

About the same teachings could be derived from Japanese patent No. 74,002,343, disclosing a method for the preparation of novel vinyl-type copolymers having polyphenylene-ether side chains, by consecutive or simultaneous reaction between polyphenylene ether, maleic anhydride and a vinylic monomer, more particularly as vinylic monomer styrene, methylstyrene, dimethylstyrene, chlorostyrene, acrylonitrile and methacrylonitrile, vinylacetate, methylacrylate, methylmethacrylate, olefins such as ethylene, propylene, isobutylene, and halogenated vinyl compounds such as vinylchloride or combinations thereof, may be used.

More particularly, the relative amount of maleic anhydride to be employed preferably exceeds the number of moles of polyphenylene ether and should generally be chosen in the range of from 1:1 to 10:1 whereas the esterification reaction should be moreover carried out in the presence of catalysts such as sulphuric acid, paratoluenesulphonic acid, zinc acetate, sodium acetate, tetrabutyl zirconate, tetrabutyl titanate or tetraoctyl titanate and at temperatures in the range of from 60°–200° C.

It will be appreciated that said disclosed catalysts cannot be used for an efficient capping process aimed at.

Although some of the hereinbefore described processes could indeed provide some progress in the art, there remained a strong need for polymer blends which are obtainable by an economically attractive process for polymerization of a vinyl substituted aromatic monomer in the presence of relatively large amounts of PPE, to be incorporated in the final polymer blends, showing the desired improved characteristics such as high temperature rigidity, and more particularly final polymer blends representing interpenetrating networks.

More particularly there is still a need for an economical manufacturing process for the preparation of modified PPE, which can successfully be applied for the manufacture of blends of polymer of vinyl substituted aromatic monomers and said modified PPE in order to get high temperature rigid, modified compositions aimed at. With the term "high temperature rigid modified compositions" as used throughout the present specification is meant compositions, which show a higher glass transition temperature (Tg) as compared with conventional compositions and as a consequence a higher Vicat softening point e.g. measured according to Vicat B DIN 53460.

As a result of extensive research and experimentation there was now surprisingly found a process for the manufacture of modified polyphenylene ether or structurally related polymers, comprising the reaction of a compound of the formula:

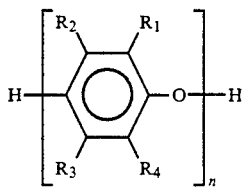

(I)

wherein $R_1$ and $R_4$ each may represent hydrogen, halogen, a phenyl group, alkenyl group, alkadienyl group, an aryloxy group, or wherein $R_1$ and $R_4$ each may represent an alkyl group or an alkoxy group, each of the latter containing 12 or less carbon atoms and each optionally substituted by halogen, cyano, hydroxy, phenyl or amino, whereas alkyl or alkoxy groups attached to the terminal phenol nucleus of the chain may be substituted by an amino, dialkylamino or a di(alkanoyl) amide group, wherein the alkyl groups each contain 4 or less carbon atoms, wherein $R_2$ and $R_3$ each may represent hydrogen, halogen, a phenyl group, alkenyl group, alkadienyl group, aryloxy group or wherein $R_2$ and $R_3$ each may represent a primary or secondary alkyl group or alkoxy group as defined for $R_1$ and $R_4$, optionally substituted by halogen, cyano, hydroxy, phenyl, and wherein $R_1$, $R_2$, $R_3$ and $R_4$ may represent different or the same groups in one repeating unit, and n represents an integer having a value of at least 50 and more preferably 100 to 500, with a cyclic acid anhydride of the general formula:

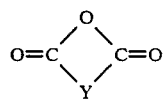

(II)

wherein Y represents a bivalent radical of the formulae

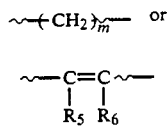

wherein m represents an integer in the range of from 2 to 8 and more preferably in the range from 2 to 4 and wherein $R_5$ and $R_6$ may each indepently represent an alkyl group of 1 to 4 carbon atoms, a phenyl group, or an aralkyl group, and preferably benzyl, or wherein R5 and $R_6$ together with the carbon atoms of the double carbon-carbon bond may form a cycloalkenyl, cycloalkadienyl or aryl group and more preferably a phenyl group, in the presence of a non nucleophilic base and in an inert polar organic solvent.

According to a more preferred embodiment of the present process the PPE or structurally related polymer is converted, using as main solvent a vinyl substituted aromatic monomer and most preferably styrene monomer.

Typical examples of the polyphenylene ether or structurally related polymers to be applied for the process of the present invention, include poly-2,6-dimethyl-1,4-phenylene ether; poly-2,6-diethyl-1,4-phenylene ether; poly-2,6-dipropyl-1,4-phenylene ether; poly-2-methyl-6-allyl-1,4-phenylene ether; poly-di-tert-butyl-dimethoxy-1,4-phenylene ether; poly2,6-dichloromethyl-1,4-phenylene ether,poly-2,6-dibromomethyl-1,4-phenylene ether; poly-2,6-di(2-chloroethyl)-1,4-phenylene ether; poly-2,6-ditolyl-1,4-phenylene ether; poly-2,6-dichloro-1,4-phenylene ether; poly-2,6-diphenyl-1,4-phenylene ether and poly-2,5-dimethyl-1,4-phenylene ether.

Preferably the symbols $R_1$, $R_2$, $R_3$ and $R_4$ in formula I represent hydrogen or an optionally substituted alkyl containing from 1 to 4 carbon atoms, and more particularly $R_1$ and $R_4$ may represent, when attached to the terminal phenol nucleus of the polyphenylene ether chain, an aminoalkyl or a (dialkylamino) alkyl group, the alkyl groups of which are containing from 1 to 4 carbon atoms.

More preferably the symbols $R_1$, $R_2$, $R_3$ and $R_4$ are selected from hydrogen and methyl, optionally substituted as defined hereinbefore, whereas $R_1$ and $R_4$ may represent when attached to the terminal phenol nucleus of the chain, an aminomethyl or a (dialkylamino)methyl group, the alkyl groups of which are containing of from 1 to 4 carbon atoms, e.g. di(n-butyl)amino.

Still more preferably the symbols $R_1$ and $R_4$ in the main chain represent both methyl, whereas the symbols $R_2$ and $R_3$ in the main chain represent both hydrogen.

The most preferred embodiment of the starting compounds according to formula I is poly-2,6-dimethyl-1,4-phenylene ether, wherein one or both of the methyl groups attached to the terminal phenol nucleus of the chain, have been substituted by an amino or dialkylamino group, containing of from 1 to 4 carbon atoms.

Preferred examples of cyclic anhydrides according to formula II are maleic anhydride, succinic anhydride, glutaric anhydride, adipic anhydride and phtalic anhydride and the like, of which maleic anhydride is the most preferred.

It will be appreciated that in the vinyl substituted aromatic monomer optionally one or more elastomeric homopolymers or copolymers may be included. More particularly homopolymers or copolymers of a vinyl substituted aromatic monomer and a conjugated diene monomer may be included. More particularly block copolymers AB or ABA comprising a block of vinyl-substituted aromatic monomer (A) and a block of conjugated diene (B) such as polystyrene and polybutadiene or polyisoprene blocks may be used. More preferably partially hydrogenated and/or modified block copolymers of a vinyl-substituted aromatic monomer and conjugated diene may be included.

Suitable examples of elastomeric polymers may be selected from polybutadiene, polyisoprene (including natural rubber), polychloroprene, butadiene-styrene random or block copolymers, prepared by emulsion or solution polymerization, polyisoprene-styrene random or block copolymers. Such included copolymer may improve the impact strength.

The vinyl substituted aromatic monomer may be selected from the group consisting of styrene, o-methylstyrene, 2,4-dichlorostyrene, p-methoxystyrene, p-nitrostyrene, p-methylstyrene, 3,4-dimethylstyrene, m-tert-butylstyrene, p-dodecylstyrene, p-phenylstyrene, p-acetoxystyrene, divinylbenzene, p-aminostyrene, p-(chloromethyl)-styrene, m-cyanostyrene, o-hydroxystyrene, p-vinylbenzoic acid, α-propylstyrene, α-undecylstyrene, o-methyl-α-methylstyrene, m-methyl-α-methylstyrene, p-methyl-α-methylstyrene, p-methoxy-α-methylstyrene, p-cyano-α-methylstyrene, m-bromo-α-methylstyrene, p-chloro-α-methylstyrene and 1,1-diphenylethylene or mixtures thereof of which styrene alone or predominantly styrene containing monomer mixtures being preferred.

As suitable examples of non nucleophilic base may be used sodium hydride, lithium hydride, potassium hydride, butyl lithium, sodium amide and the like, of which sodium hydride is the most preferred.

As suitable inert organic solvents may be used tetrahydrofuran, acetone, methylene chloride, ethyl acetate and the like.

It was surprisingly found that effective, economically attractive conversions could only be obtained by using the hereinbefore specified base, whereas other types of bases such as triethylamine, potassium carbonate, sodium carbonate, potassium butanolate and sodium were found to provide unattractive results.

It will be appreciated that in the event that $R_1$, $R_2$, $R_3$ or $R_4$ represents a substituent containing a hydroxyl group, a corresponding excess amount of the cyclic acid anhydride is used.

The vinyl substituted aromatic monomer itself and more preferably styrene, or mixtures of them is used as solvent for the preparation of the modified PPE or structurally related polymer. During this conversion a reaction temperature is applied in the range of from 0° to 60° C. and more preferably from 10° to 30° C.

According to a preferred embodiment of the process of the present invention for preparation of capped PPE or structurally related polymer, an amount of 5–50% by weight of e.g. unmodified PPE calculated on the weight of the complete reaction mixture, is converted.

However, in principle higher concentrations of unmodified PPE or structurally related polymer may be converted too, whereafter the obtained reaction mixture may be diluted with additional vinyl substituted aromatic monomer to the desired concentration of PPE, before starting the polymerization process.

On the other hand, one can also prepare low concentration PPE solutions in vinyl substituted aromatic monomer and remove a part of this monomer by evaporation to obtain the desired concentration of PPE.

More preferably unmodified PPE or a structurally related polymer is used in the starting mixture in a concentration of 30–50% by weight.

With the term "unmodified PPE or structurally related polymers", as used throughout the present specification, are meant polymers, having terminal free hydroxy groups.

The cyclic acid anhydride according to formula II may be used in a concentration in the starting reaction solution, e.g. in styrene, of from 0.05 to 0.5% by weight and more preferably from 0.1 to 0.3% by weight, calculated on the weight of the complete reaction mixture.

The non nucleophilic base is used in an amount in the range of from 0.8 to 1.5 molar equivalents of the acid anhydride used and more preferably in the range of from 1.0 to 1.2 molar equivalents.

It will be appreciated that according to the present conversion process of unmodified PPE or structurally related polymer, bearing terminal free hydroxy groups, modified PPE or structurally related polymer is quickly and efficiently obtained as compared with prior art processes.

It will be appreciated that the modified PPE (poly-2,6-dimethylparaphenylene oxide, having a $\overline{M}_n$ of about 20,000) which has been converted with maleic anhydride according to the present invention and isolated by precipitation in methanol shows a characteristic H-NMR δ-value=6.3 ppm, in addition to δ-values of the unmodified PPE. This δ-value=6.3 ppm can be assigned to the protons of coupled maleic acid groups and appears instead of the characteristic δ-value=7.1 ppm, which can be assigned to present unreacted maleic anhydride.

These before-mentioned δ-values were measured under the following analysis conditions:

| nucleus | ¹H | solvent | $C_6D_6$ |
|---|---|---|---|
| frequency | 200 MHz | temperature | 50° C. |
| spectrometer | Bruker | reference | HMDS |

It will be appreciated that another aspect of the present invention is formed by the use of the modified PPE or a structurally related polymer for the manufacture of modified polymers of vinyl substituted aromatics by means of several polymerization methods, dependent on the finally desired application of said compositions.

In the event that the modified PPE or a structurally related polymer was prepared in an inert polar organic solvent different from the vinyl substituted aromatic monomer, such as tetrahydrofuran, benzene, toluene and the like, such a solvent can be partially or substantially removed before or during mixing the modified PPE with the vinyl substituted aromatic monomer for further processing.

Accordingly the present invention is also relating to a process for the manufacture of high temperature rigid modified poly(vinyl substituted aromatic) compositions, comprising the polymerization of a vinyl substituted aromatic monomer in the presence of a modified polyphenylene ether or a structurally related polymer, obtainable by reaction of a compound of the formula I wherein $R_1$, $R_2$, $R_3$ and $R_4$ are as defined hereinbefore, with a compound of formula II wherein the symbols m, $R_5$ and $R_6$ are as defined hereinbefore, in the presence of a non nucleophilic base and in an inert polar organic solvent and more preferably in a vinyl substituted aromatic monomer as solvent.

It will be appreciated by persons skilled in the art that such a process enables an economically very attractive manufacture of the desired vinyl substituted aromatic polymers, modified by the incorporation of PPE or a structurally related polymer.

For example beads of modified polymers of vinyl substituted aromatics may be prepared by aqueous suspension polymerization. Such beads may be optionally impregnated by a physically and/or chemically blowing agent during or after the polymerization process. Such beads may be applied for e.g. injection moulding, extrusion etc., to prepare a great variety of engineering plastics when non-impregnated beads are used, and may be applied in impregnated expandable forms to prepare a great variety of engineering foams.

It will be appreciated that the polymerization of the vinyl substituted aromatic monomer, containing the modified (capped) PPE or structurally related polymer may also be carried out as bulk polymerization, optionally in the presence of usual auxiliaries, such as fillers, fibres or non-woven webs, dyes, stabilizers or flame retardants, to form shaped articles.

Especially the manufacture of thermoplastic matrix polymer compositions, having a specifically desired shape, was not possible up to now. Therefore, it is an unexpected advantage of the process of the present invention that such shaped thermoplastic matrix polymers are provided now.

It was found that the modified PPE or structurally related polymer could be incorporated in situ into the polymer compositions to be formed during polymerization of the vinyl substituted aromatic in a sufficiently effective amount and in an economically attractive way. More particularly the modified PPE or structurally related polymer could be incorporated in an economically attractive way, into beads of polymers of the vinyl substituted aromatics and more preferably styrene, which are formed during aqueous suspension polymerization of such monomers.

With the term "in a sufficiently effective amount" as used throughout the present specification, is meant to indicate that the modified PPE or structurally related polymer can be incorporated in situ during the preparation of these matrix polymer blend beads of the polymer of vinyl substituted aromatic to provide to them the desired heat stability. For example increase of Tg of the final beads of about 40° C. as compared with beads substantially free of PPE or structurally related polymer, when containing an amount of about 40% by weight of PPE or structurally related polymer, calculated on the weight of the final matrix polymer blend composition.

Preferably the modified PPE or structurally related polymer, and more preferably PPE, obtained according to hereinbefore specified conversion, is subsequently used for incorporation into matrix polymer blend beads, to be formed by means of aqueous suspension polymerization to be carried out by methods known in principle.

The polymerization process may be carried out in any suitable reactor equipped with heating means and agitating means. The reaction mixture, obtained by the conversion of unmodified PPE or structurally related polymer, is heated for a period of time and a temperature to cause the vinyl substituted aromatic monomer to polymerize. Generally temperatures of from 80° to 175° C. may be employed and preferably in the range of from 90° to 130° C. for a period of 2 to 10 hours. If temperatures above the boiling point of vinyl substituted aromatic monomer are used or if blowing agents have to be impregnated during polymerization pressure vessels should be used to prevent vaporization.

According to a preferred embodiment of the aqueous suspension polymerization, the amount of water may vary from 1 to 10 parts by weight, per part by weight of the reaction mixture containing the modified PPE or structurally related polymer and vinyl substituted aromatic monomer(s) and preferably from 1 to 2 parts water per part by weight of the reaction mixture. The aqueous dispersion to be used may optionally contain a dispersion stabilizer and one or more polymerization catalysts.

Examples of such dispersion stabilizers include polyvinyl alcohol, gelatine, agar, starch, glycerine, sodium salt of polyacrylic acid and polymethacrylic acid, polyethylene glycol, hydroxyethyl cellulose, carboxymethyl cellulose, methyl cellulose, ethylene glycol, polyacrylamide and 1:1 copolymer of e.g. styrene and maleic anhydride. The amount of the dispersion stabilizer to be used is ordinarily from 0.0001 to 3% by weight and preferably from 0.001 to 1.5% by weight and more preferably 0.01 to 0.7% by weight, based on the weight of the water used.

Typical examples of the polymerization catalysts include decanoylperoxide; benzoylperoxide; laurylperoxide; octanoylperoxide; stearylperoxide; 3,5,5-trimethylhexanoylperoxide; tert-butylperbenzoate; tert-butylperacetate; tert-butylperpivalate; diisopropylphenylhydroperoxide; 2,5-dimethyl-2,5-di-tert-butyl-peroxyhexane; di-tert-butylperoxide; cyclohexanoneperoxide; dicumylperoxide; δ,δ'-azobis-(isobutyronitrile), tert-butylperoxyisobutyrate and tert-butylperoxylaurate.

These radical initiators are preferably high temperature decomposing type catalysts or are used in the form of a combination of 2 or more catalysts, e.g. a combination of a low temperature decomposing type catalyst with a high temperature decomposing type catalyst. In case the combination of a low temperature decomposition type catalyst with a high temperature decomposing type catalyst is used, the polymerization is effected initially at below about 90° C. and, after a certain extent of polymerization yield has been attained, the temperature of the system is elevated to carry out the polymerization substantially completely at a high temperature.

Preferred combinations of the catalysts used include combinations of lauroylperoxide with dicumylperoxide; lauroylperoxide with di-tert-butylperoxide; lauroylperoxide with tert-butylperoxybenzoate; lauroylperoxide with 2,5-dimethyl-2,5-di-tert-butylperoxyhexane; lauroylperoxide with benzoylperoxide; 3,5,5-trimethylhexanoylperoxide with dicumylperoxide; 3,5,5-trimethylhexanoylperoxide with tert-butylperoxybenzoate; 3,5,5-trimethylhexanoylperoxide with benzoylperoxide; 3,5,5-trimethylhexanoylperoxide with di-tert-butylperoxide; tert-butylperoxypivalate with di-tert-butylperoxide; tert-butylperoxypivalate with dicumylperoxide; tert-butylperoxypivalate with tert-butylperoxybenzoate; 2,4-dichlorobenzoylperoxide with tert-butylperoxybenzoate; 2,4-dichlorobenzoylperoxide with dicumylperoxide; 2,4-dichlorobenzoylperoxide with di-tert-butylperoxide; 2,4-dichlorobenzoylperoxide with 2,5-dimethyl-2,5-di-tert-butylperoxyhexane; octanoylperoxide with dicumylperoxide, octanoylperoxide with di-tert-butylperoxide, and benzoylperoxide with di-tert-butylperoxybenzoate.

In the present invention, the polymerization catalyst may be used in an amount suitable for polymerization of the vinyl substituted aromatic compound. For adequate practice of the present invention, the catalyst is used in an amount of 0.01 to 1% by weight, preferably 0.3 to 0.7% by weight, based on the weight of the fed monomers.

The obtained modified poly(vinyl substituted aromatic) and more preferably polystyrene beads, containing the modified PPE or structurally related polymer, may be impregnated with a blowing agent to provide the desired expandable beads of modified polymer of vinyl substituted aromatic during or after polymerization.

The invention is further illustrated by the following examples, however without restriction of its scope to these specific embodiments.

EXAMPLE 1

Several polyphenylene ethers having a mol. weight in the range from $M_n$ 20,000 to $M_n$ 30,000 (such as PPE 800 and PPE 808 from General Electric Company showing an intrinsic viscosity in chloroform of about 0.48 and 0.42 respectively) were dissolved in styrene in about 1 hr at room temperature, in an amount of 30% by weight, based on the weight of the total composition. Subsequently maleic anhydride and sodium hydride were added in amounts of 0.1% by weight and 0.025% by weight respectively, calculated on the weight of the total reaction mixture. After one hr stirring at room temperature a small sample of the reaction mixture was precipitated in methanol at room temperature and analyzed by H-NMR. The H-NMR analysis showed the characteristic $\delta$-value=6.3 ppm mentioned hereinbefore.

Hereafter the temperature was increased to 70° C. and water, containing 0.2% by weight of Natrosol 250G (trade mark) (I.V.=350 mPa/sec, 2% aqueous solution measured at 25° C.) of 70° C. was added.

Thereafter the obtained suspension was heated to 93° C. and radical polymerized during five hours in the presence of dibenzoylperoxide (DBPO), followed by subsequent reaction during three hours at 110° C.–120° C. in the presence of tert-butylperoxybenzoate (TBPB).

Regular spherical beads were obtained, showing a Tg of about 130° C. These obtained beads were subsequently impregnated with a blowing agent.

EXAMPLE 2

Several polyphenylene ethers [poly(2,6-dimethyl1,4-phenylene) ether] having a number average molecular weight $M_n$ in the range of from 20,000 to 30,000 were dissolved in styrene at room temperature to provide a 10% by weight solution and maleic anhydride, and sodium hydride were added in amounts to give concentrations of 0.2% by weight and 0.05% by weight respectively (calculated on the weight of the total reaction system). After stirring for one hour at room temperature the solution was heated to 130° C. and prepolymerized for one hr.

The solution was then suspended in water containing 0.2% by weight Natrosol 250G and polymerized in the usual way.

This resulted in spherically round beads with a Tg of ±110° C.

A similar experiment was carried out, using 20% by weight of PPE, except for the pre-polymerization step. After heating to 130° C. the solution was suspended, resulting in transparent beads with a Tg of ±120° C.

EXAMPLE 3

A polyphenylene ether having a number average molecular weight $M_n$ in the range of from 20,000 to 30,000 was dissolved in tetrahydrofuran (THF) at room temperature to provide a 20% by weight solution, based on the weight of the total composition.

Subsequently maleic anhydride and potassium hydride were added in amounts to give concentrations of 0.2% by weight and 0.05% by weight respectively (calculated on the weight of the total reaction mixture).

After stirring for one hour at room temperature a small sample of the reaction mixture was precipitated in methanol at room temperature after concentration under vacuo evaporation of the tetrahydrofuran as much as possible.

The alleged structure was confirmed by H-NMR analysis of the product obtained from a sample taken from the reaction mixture and precipitated in methanol at room temperature.

Hereafter the tetrahydrofuran was evaporated under vacuo to concentrate the solution, and styrene was added to reach a 30% solution of the modified PPE in styrene, based on the total weight of the composition.

The obtained solution was suspended in water of 70° C., containing 0.2% by weight of Natrosol 250G and the temperature was adjusted at 90° C. The obtained suspension was radical polymerized during five hours in the presence of DBPO, followed by subsequent reaction during three hours at 110°–120° C. in the presence of TBPB. Regular spherical beads were obtained showing a Tg of about 130° C.

EXAMPLE 4

A polyphenylene ether having a number average molecular weight $M_n$ in the range of from 20,000 to 30,000 was dissolved in styrene in about 1 hr at room temperature in an amount of 30% by weight, based on the weight of the total composition. Subsequently phthalic anhydride and sodium hydride were added in amounts of 0.1% by weight and 0.025% by weight respectively, calculated on the weight of the total reaction mixture.

After stirring one hr at room temperature, the solution was heated to 130° C. and prepolymerized for one hour. The solution was then suspended in water containing 0.2% by weight of Natrosol 250G and polymerized in the usual way. The obtained product was consisting of spherically round beads with a Tg of 110° C.

A similar experiment was carried out using 20% by weight of PPE, except for the prepolymerization step. After heating to 130° C. the solution was suspended, resulting in beads with a Tg of ±120° C.

The alleged structure was confirmed by H-NMR analysis of the product obtained from a sample taken from the reaction mixture and precipitated in methanol at room temperature.

COMPARATIVE EXAMPLE A

In the same way as described for Example 3, a reaction mixture was composed containing PPE in THF, maleic anhydride, and N,N-dimethyl-4-aminopyridine in an amount of 0.01% by weight instead of potassium hydride.

After 1 hour stirring at room temperature no conversion could be detected. The desired conversion could not be reached at higher temperatures (up to 50° C.). No conversion could be detected after one hour stirring of reaction mixtures as specified in the following table.

TABLE

| Experiment | Solvent | Temp. | Base in addition to DMAP |
|---|---|---|---|
| B | methylene chloride | room temp. | — |
| C | acetone | room temp. | — |
| D | ethyl acetate | 77° C. | — |
| E | acetone | 55° C. | triethylamine |
| F | acetone | 55° C. | potassium carbonate |
| G | THF | room temp. | potassium butanolate |
| H | THF | room temp. | sodium |

We claim:

1. Process for incorporating a modified polyphenylene ether into a poly(vinyl substituted aromatic) polymer, comprising polymerizing a vinyl substituted aromatic monomer in the presence of the modified polyphenylene ether obtained by a previous reaction of a polymer of the formula:

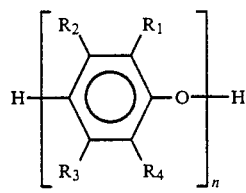

wherein $R_1$ and $R_4$ each represent hydrogen, halogen, a phenyl group, alkenyl group, alkadienyl group, an aryloxy group, or wherein $R_1$ and $R_4$ each represent an alkyl group or an alkoxy group, each of the latter containing 12 or less carbon atoms and each optionally substituted by halogen, cyano, hydroxy, phenyl or amino, whereas alkyl or alkoxy groups attached to the terminal phenol nucleus of the chain optionally are substituted by an amino, dialkylamino or a di(alkanoyl) amide group, wherein the alkyl groups each contain 4 or less carbon atoms, wherein $R_2$ and $R_3$ each represent hydrogen, halogen, a phenyl group, alkenyl group, alkadienyl group, aryloxy group, or wherein $R_2$ and $R_3$ each represent a primary or secondary alkyl group or alkoxy group as defined for $R_1$ and $R_4$, optionally substituted by halogen, cyano, hydroxy, phenyl, and wherein $R_1$, $R_2$, $R_3$ and $R_4$ represent different or the same groups in one repeating unit, and n represents an integer having a value of at least 50, with a cyclic acid anhydride of the formula:

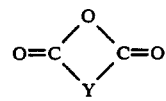

wherein Y represents a bivalent radical of the formulae

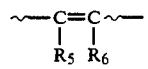

wherein m represents an integer in the range of from 2 to 8 and wherein $R_5$ and $R_6$ each independently represent an alkyl group of 1 to 4 carbon atoms, a phenyl group or an aralkyl group or wherein $R_5$ and $R_6$ together with the carbon atoms of the double carbon-carbon bond form a cycloalkenyl, cycloalkadienyl or aryl group, in the presence of a non nucleophilic base and in an inert polar organic solvent.

2. Process according to claim 1, wherein said vinyl substituted aromatic monomer is styrene.

3. Modified rigid (vinyl substituted aromatic) composition, obtained by the process of claim 1.

* * * * *